US006082887A

United States Patent [19]

Feuer et al.

[11] Patent Number: 6,082,887

[45] Date of Patent: Jul. 4, 2000

[54] GAME MACHINE WITH AUTOMATED TOURNAMENT MODE

[75] Inventors: Peter Feuer, Rydal; John W. Houriet, Jr., Yardley; James R. Stelzer, Bensalem, all of Pa.; Kevin A. Hassan, Mountainside, N.J.; Jeffrey D. Karn, Warrington, Pa.

[73] Assignee: Merit Industries, Inc., Bensalem, Pa.

[21] Appl. No.: 09/099,170

[22] Filed: Jun. 18, 1998

Related U.S. Application Data

[63] Continuation-in-part of application No. 08/717,152, Sep. 20, 1996.

[51] Int. Cl.[7] .................................................... G06F 17/00

[52] U.S. Cl. .......................................................... 364/410.1

[58] Field of Search ............................ 364/410.1, 411.1, 364/412.1; 463/1, 40, 41, 42; 273/DIG. 26

[56] References Cited

U.S. PATENT DOCUMENTS

| | | |
|---|---|---|
| 3,876,208 | 4/1975 | Wachtler et al. . |
| 3,959,640 | 5/1976 | Syria . |
| 4,072,930 | 2/1978 | Lucero et al. . |
| 4,494,197 | 1/1985 | Troy et al. . |
| 4,569,526 | 2/1986 | Hamilton . |
| 4,582,324 | 4/1986 | Koza et al. . |
| 4,592,546 | 6/1986 | Fascenda et al. . |
| 4,593,904 | 6/1986 | Graves . |
| 4,648,604 | 3/1987 | Horan . |
| 4,652,998 | 3/1987 | Koza et al. . |
| 4,842,275 | 6/1989 | Tsatskin . |
| 4,858,930 | 8/1989 | Sato . |
| 5,042,818 | 8/1991 | Weingardt . |
| 5,083,271 | 1/1992 | Thacher et al. . |
| 5,114,155 | 5/1992 | Tillery et al. . |
| 5,332,218 | 7/1994 | Lucey . |
| 5,359,510 | 10/1994 | Sabaliauskas . |
| 5,450,318 | 9/1995 | Mowers et al. . |
| 5,558,339 | 9/1996 | Perlman . |
| 5,697,844 | 12/1997 | Von Kohorn . |
| 5,711,715 | 1/1998 | Ringo et al. . |
| 5,855,516 | 1/1999 | Eiba . |
| 5,917,725 | 6/1999 | Thacher et al. ...................... 364/410.1 |
| 5,971,397 | 10/1999 | Miguel et al. . |

FOREIGN PATENT DOCUMENTS

| | | |
|---|---|---|
| 2192342 | 1/1988 | United Kingdom . |

OTHER PUBLICATIONS

Masterline[SM] Software by Phone, Issue Two, Control Video Corporation, top score instructions, approximate publication date—1984, exact date unknown.

Masterline[SM] Software by Phone, Play Top Score instructions, Drelbs Game Instructions, Control Data Corporation, approx. publication date—1984, exact date unknown.

Schrage, M., "Videogame Jockeys Can Play by Phone", *Washington Post*, May 4, 1983, pp. D9, D12.

Gameline™ advertisement, *Electronic Games*, Jul. 1983.

*Primary Examiner*—George Manuel

*Attorney, Agent, or Firm*—Akin, Gump, Strauss, Hauer & Feld, L.L.P.

[57] ABSTRACT

A game machine includes a tournament mode for conducting automated tournaments. In the tournament mode, a plurality of tournament games are playable by a plurality of players on the game machine. Each of the plurality of tournament games generates a total player score upon completion of game play. The player scores are used to determine the tournament winners. One or more sequences of tournament games are preprogrammed from the plurality of tournament games, and a tournament period is programmed for each tournament game. The preprogrammed tournament game for each sequence is playable during the programmed tournament period for the respective sequence. A plurality of sequences of tournament games may be preprogrammed to run simultaneously. The tournament sequences may either continuously repeat or may end after the last tournament in the sequence is completed.

9 Claims, 14 Drawing Sheets

FIG. 3
TOURNAMENT
SOLITAIRE
TOURNAMENT ENTRY CONSISTS OF
3 ROUNDS TOTAL SCORE
PLAY AS OFTEN AS YOU LIKE
EACH ENTRY INCREASES
THE PRIZE POOL
BEAT THE HIGH SCORES
TO QUALIFY FOR PRIZES
TOURNAMENT ENDS
Fri. Jun 02
11:00
MALFUNCTION VOIDS TOURNAMENT ENTRY

Example 1: REPEAT MODE

This sequence will run SOLITAIRE, RUN 21, ROYAL FLASH, 11-UP, SOLITAIRE, RUN 21, ETC.

Example 2: REPEAT MODE

This sequence will run SOLITAIRE, RUN 21, ROYAL FLASH, 11-UP, TRI-TOWERS, SOLITAIRE, ETC.

Example 3: END MODE

This sequence will run SOLITAIRE and then END.

Example 4: END MODE

This sequence will run SOLITAIRE, RUN 21, ROYAL FLASH, 11-UP, TRI-TOWERS and then END.

GAME MACHINE WITH AUTOMATED TOURNAMENT MODE

CROSS-REFERENCE TO RELATED APPLICATIONS

This application is a continuation-in-part of copending U.S. application Ser. No. 08/717,152 filed Sep. 20, 1996, entitled "GAME MACHINE WITH AUTOMATED TOURNAMENT MODE," the entire disclosure of which is incorporated herein by reference.

BACKGROUND OF THE INVENTION

The present invention relates generally to an electronic game machine, and more particularly to a game machine adapted to conduct automated tournaments.

Local entertainment facilities sometimes set up a tournament to be played on one or more game machines located in their facilities. The tournament may have a fixed prize pool, or may have a prize pool which is a function of the number of players in the tournament. After each player completes game play, an attendant records the player's score, or the player enters his or her name and score on a board located in the facility. At the completion of the tournament, the tournament winners are identified and winners collect their prizes. Tournaments which are conducted in this manner suffer from many disadvantages. For example, the entire process of recording names, tracking scores, identifying winners, and calculating the prize pool (when the prize pool is a function of the number of players) is performed manually and is thus subject to error. If attendants are not familiar with all tournament participants, a mistake could be made when handing out the prizes. In a manually run tournament, the winner may have to be present at the conclusion of the tournament to avoid the necessity of maintaining records and making prize payouts at a later date. A manually run tournament typically must have a short time period to avoid taxing the personnel resources of the facility. In view of these problems, and others associated with manually run tournaments, entertainment facilities are very limited in the frequency, variety and extent of tournaments that they can conduct for their patrons.

Video games that allow high scorers to enter their initials into a machine for public display during an Attract Mode or during game play are well-known. However, such games do not conduct prize-awarding tournaments. The display of high scorers merely provides a psychological reward for top scoring players because their initials remain on the display screen for others to see.

Accordingly, there is a need for a tournament system and methods which would allow entertainment facilities to conduct tournaments on a more frequent basis and for varying durations of time, to conduct a variety of different types of tournaments at the same time, to conduct tournaments with a minimal amount of attendant or operator support, to conduct a tournament in a completely paperless manner, to track prize pools and prize payouts in a convenient and secure manner, and to allow tournaments to be conducted without the necessity of all of the players being present at the end of the tournament. The present invention fulfills these needs.

BRIEF SUMMARY OF THE INVENTION

The present invention provides an automated tournament system for use with a game machine. The game machine includes a tournament mode for conducting automated tournaments. In the tournament mode, a plurality of tournament games are playable by a plurality of players on the game machine. Each of the plurality of tournament games generates a total player score upon completion of game play. The player scores are used to determine the tournament winners. One or more sequences of tournament games are preprogrammed from the plurality of tournament games, and a tournament period is programmed for each tournament game. The preprogrammed tournament game for each sequence is playable during the programmed tournament period for the respective sequence. A plurality of sequences of tournament games may be preprogrammed to run simultaneously. The tournament sequences may either continuously repeat or may end after the last tournament in the sequence is completed.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
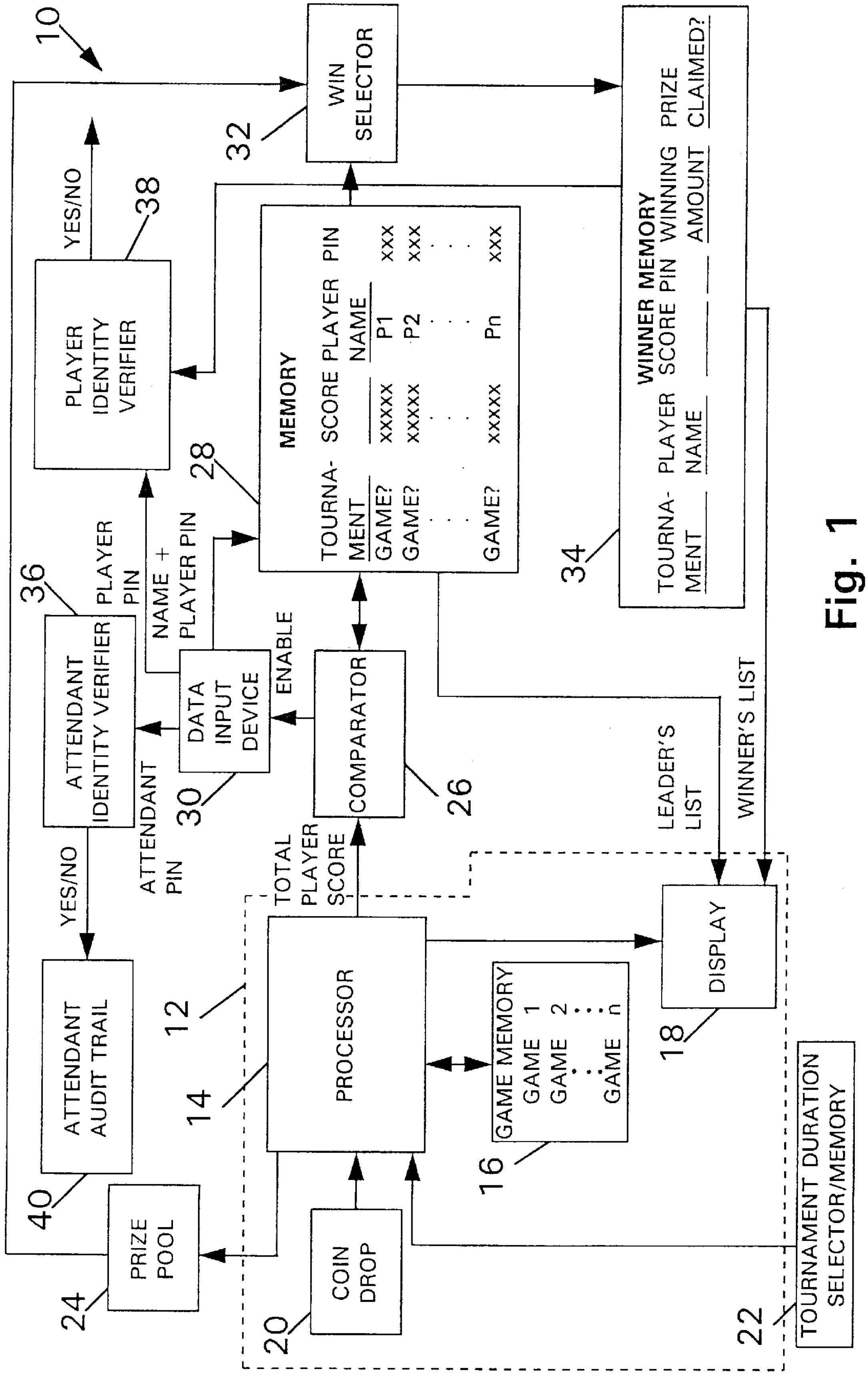
FIG. 1 is a schematic block diagram of a preferred embodiment of a tournament system of the present invention.

Certain terminology is used herein for convenience only and is not be taken as a limitation on the present invention. In the drawings, the same reference numerals are employed for designating the same elements throughout the several figures.

The automated tournament system of the present invention may be used with any game machine having computer-related circuits attached thereto. In the preferred embodiment of the invention, the game machine is a stand-alone, coin-operated video game machine which is preloaded with a plurality of different video games, each of which are selectable for game play. The video game machine may allow for each of the video games to be played in either a regular (non-tournament) mode, or in a tournament mode. In the tournament mode, a percentage of the currency deposited into the machine to play a video game is preferably allocated to the tournament prize pool.

OVERVIEW OF AUTOMATED TOURNAMENT SYSTEM

An overview of the tournament system, implemented in the environment of a stand-alone, coin-operated video game machine, is now described.

A game machine operator, or the proprietor of the facility where the video game machine is located, enters a game setup mode and performs at least the following functions:

1. A selected number of pre-loaded video games are designated as games which can be played in the tournament mode;
2. A portion of each tournament game price is programmed to be allocated to the prize pool. An initial seed amount may also be set;
3. The number of potential winners and their respective percentages of the prize pool are designated (e.g., three winners per game: first place winner gets 50%, second place winner gets 30%, third place winner gets 20%);
4. A tournament duration (start and stop date and time) is designated;
5. Cost for each tournament game is set; and
6. A personal identification number (PIN) of alphanumeric characters is assigned to each attendant at the facility who is authorized to validate and award prizes. Next, the setup mode is exited and the video game machine becomes ready for game play.

One player at a time inserts currency into the video game machine, selects a tournament game, and plays the game. A score is generated for each game. At the end of game play, a total player score is achieved. If the game has plural rounds, the total player score is the cumulative total of all the rounds.

The video game machine includes a Leaders List of the players with the highest total player scores during the tournament duration. If the tournament ultimately awards prizes for the three top scores, the Leaders List has three names and scores thereon for each game. If the tournament ultimately awards prizes for the five top scores, the Leaders List has five names and scores thereon for each game, and so on. The Leaders List constantly changes throughout the tournament duration to reflect the latest high scoring players. If a current player has achieved a sufficiently high score to be placed on the Leaders List, the current player is prompted to enter his or her name. The current player is then prompted to enter a personal identification number (PIN), such as a four digit number of alphanumeric characters. The PINs of each player on the Leaders List are stored in the video game. At the end of a tournament, the current players on the Leaders List are the tournament winners and split the prize pool in the predetermined manner. The players on the Leaders List are transferred to a Winners List. The Winners List includes all of the winning players from all tournaments that were recently concluded. A sample Winners List may include twelve names, as follows:

1. Six winners from a tournament held from Jun. 1, 1996 to Jul. 1, 1996, consisting of three winners from tournament video game 1 and three winners from tournament video game 2, and
2. Six winners from a tournament held from Jul. 2, 1996 to Aug. 2, 1996, consisting of three winners from tournament video game 1 and three winners from tournament video game 2.

The Winners List is displayed on the screen of the video game machine during an Attract Mode, or in response to pressing an appropriate button on the machine.

A player who made it onto the Leaders List during tournament duration will likely return to the video game machine after the tournament is over to see if he or she made it onto the Winners List, and is thus eligible to claim a prize. If a player notices his or her name on the Winners List, the player selects his or her name from the display screen, and is prompted to call an attendant. The attendant enters his or her preassigned PIN. If the attendant PIN is valid, the video game machine prompts the player to reenter the same PIN that the player originally entered when he or she was placed on the Leaders List. If the originally entered PIN matches the newly entered PIN, the video game machine verifies the player's identity and indicates that the player may be awarded the prize. The video game machine records the fact that the prize for that player has been awarded so that it cannot be awarded twice. The video game machine also records the PIN of the attendant. The attendant then physically awards the prize, or directs someone else in the facility to do so. Unclaimed prizes remain on the Winners List until claimed, or until cleared by the facility.

DETAILED DESCRIPTION OF AUTOMATED TOURNAMENT SYSTEM

FIG. 1 shows a schematic block diagram of a preferred embodiment of the present invention, referred to generally as tournament system 10, implemented in the environment of a stand-alone, coin-operated video game machine. The elements of the system 10 within the dashed lines comprise conventional components of a video game machine 12, and are thus not described in detail. The video game machine 12 includes a processor 14, a game memory 16, a display 18, and a coin drop 20. The game memory 16 includes a plurality of different individually selectable games 1 to n. The remaining elements in FIG. 1 are appended to the conventional components of a video game machine 12. While they are depicted in FIG. 1 as being separately located elements, they are preferably incorporated into the processing and memory elements of the video game machine 12. As noted above, each of the video games may be played in either a regular, non-tournament mode, or in a tournament mode. Games played in a tournament mode preferably cost more to play than the same game played in the non-tournament mode. The cost differential, or premium, may be used to build up the prize pool. The following description of FIG. 1 presumes that the tournament mode of a game is selected.

During the setup mode, the tournament duration for each tournament game is set and stored in the tournament duration selector/memory 22. Specifically, start and stop dates and times are selected. The tournament duration may be as short as a few hours, or may be very long, such as a month. The processor 14 is programmed to allocate a percentage of the coin drop 20 to a prize pool 24 during the duration of the tournament. Once all of the setup parameters are entered, the video game machine 12 is placed in a game play mode or normal operating mode. The setup mode is described in more detail below, with respect to FIGS. 9–12.

Figure 2:
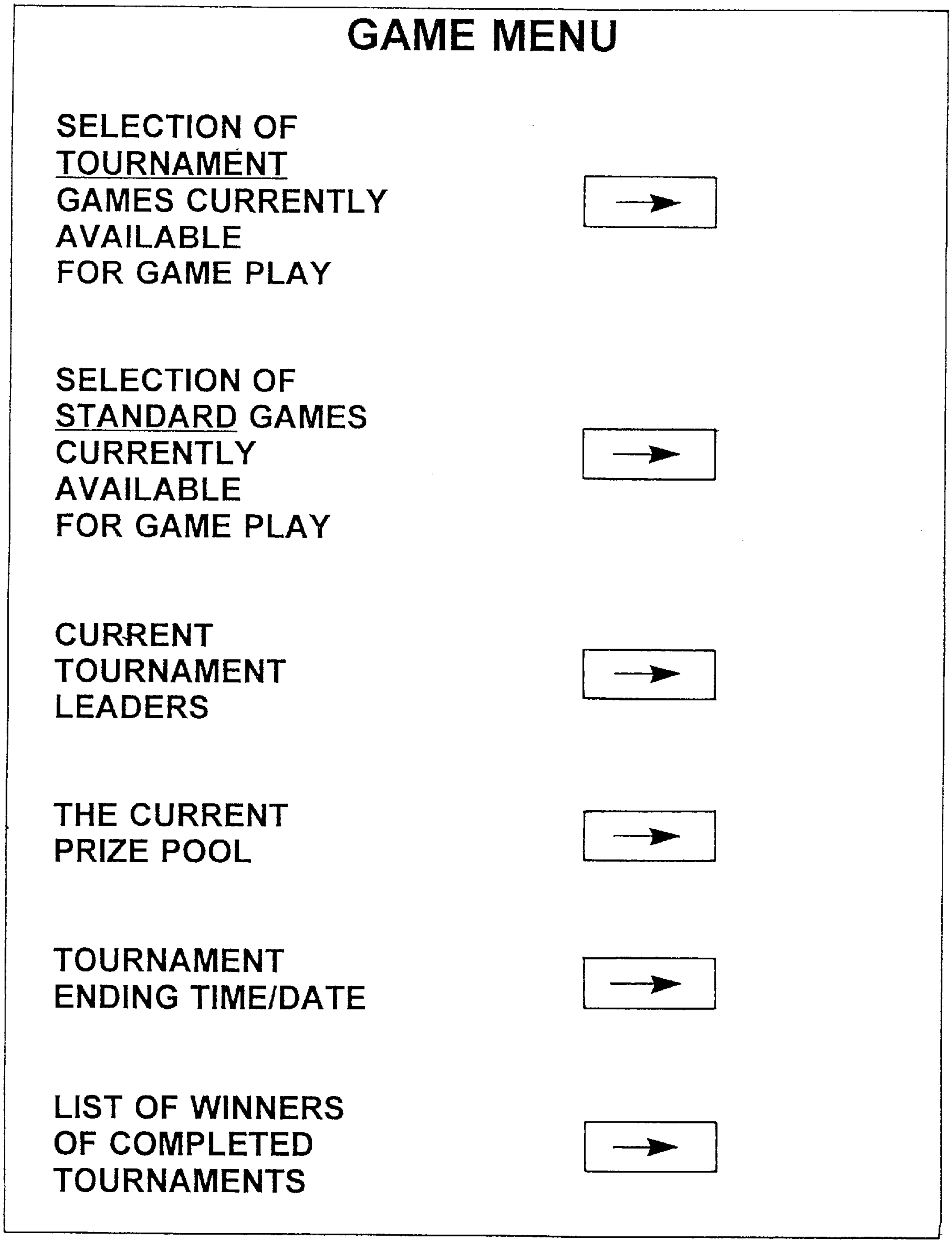
FIG. 2 is a Game Menu display screen for the tournament system of FIG. 1.
Figure 3:
FIG. 3 is an information display screen for a tournament game played by the tournament system of FIG. 1.

In the game play mode or normal operating mode, the display 18 shows an Attract Mode until a potential player selects a Game Menu or other type of menu. If the potential player selects a Game Menu, one or more successive display screens allow the potential player to view the current tournament leaders, the current prize pool, the tournament ending time/date, a list of winners of completed tournaments, and a selection of tournament games currently available for game play. A sample Game Menu is shown in FIG. 2. Upon making a game selection, the display 18 provides general information and game rules to the potential player about the selected game. FIG. 3 shows a sample information screen for a tournament game of SOLITAIRE. If the player wishes to play the game, the player deposits the appropriate currency into the coin drop 20 and plays the game in the normal manner.

Figure 4:
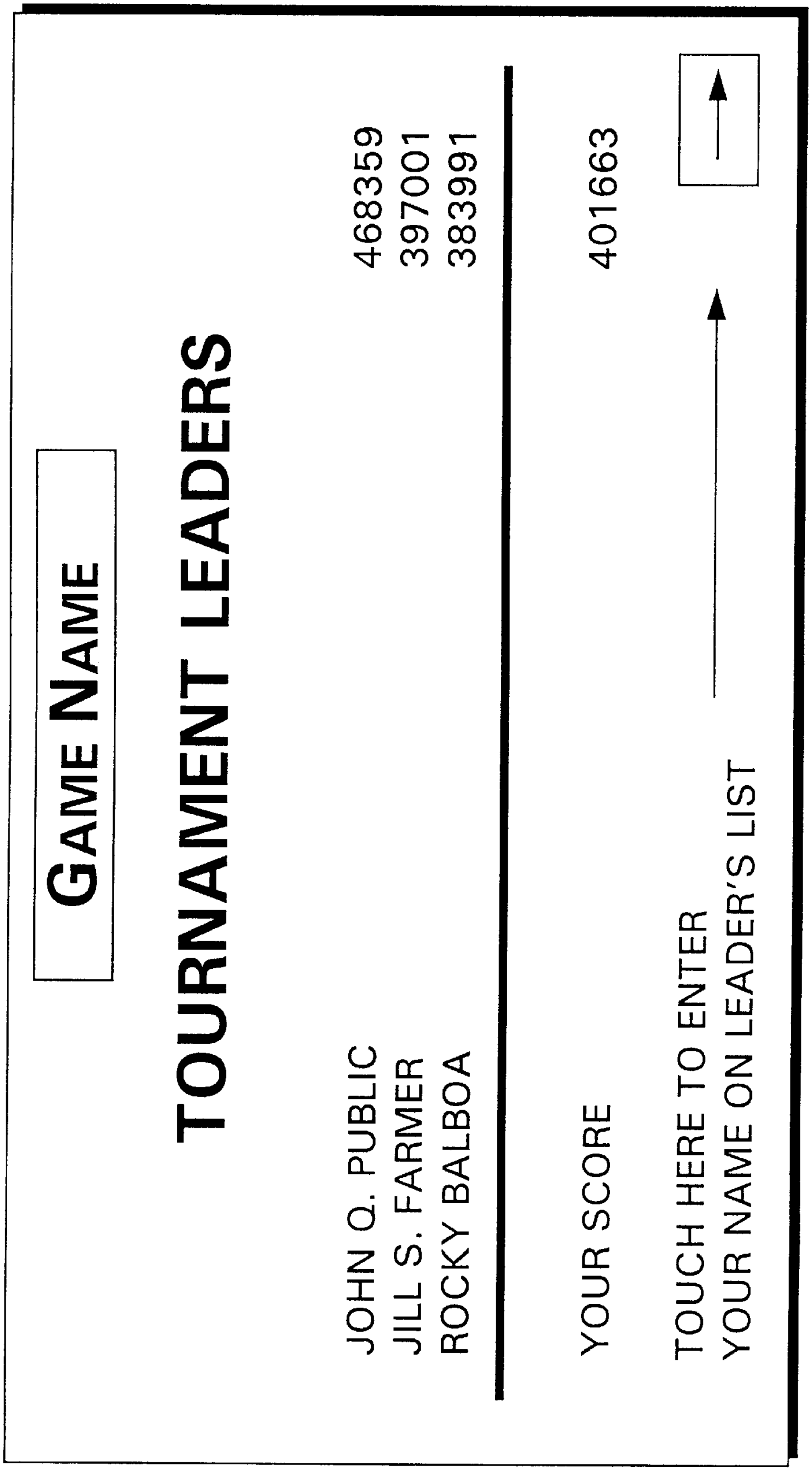
FIG. 4 is a Leaders List display screen for the tournament system of FIG. 1.
Figure 5:
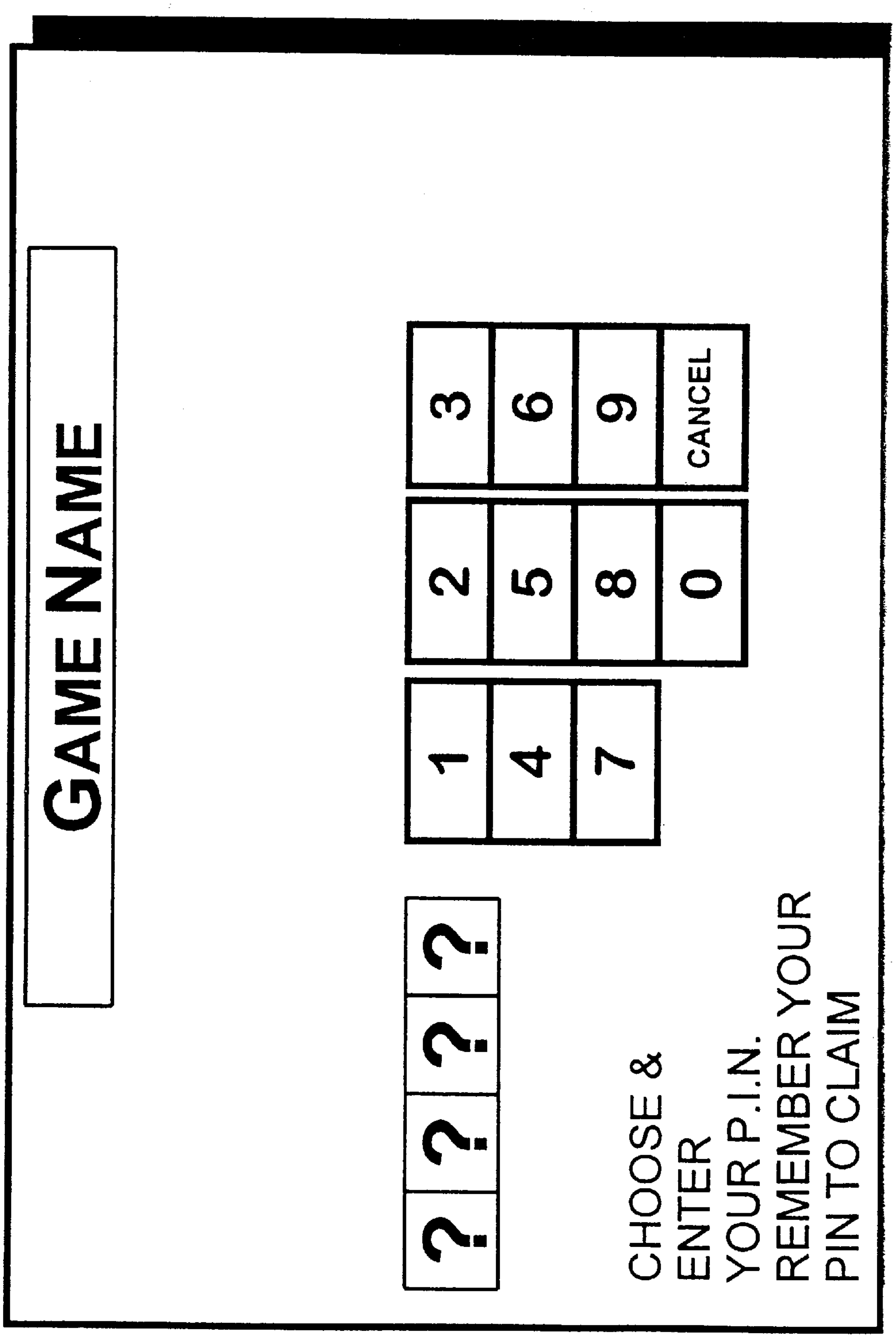
FIG. 5 is a Personal Identification Number (PIN) Entry display screen for the tournament system of FIG. 1.

After a player completes a round of game play, the processor 14 outputs a total player score. The total player score is received by a comparator 26. The comparator 26 compares the current player's score with the scores of previous tournament players stored in memory 28. Memory 28 tracks score data for potential tournament winners for each of the tournament games which can be played by the video game machine 12. Specifically, the memory 28 includes player names and their respective scores and PINs for previous players who achieved sufficiently high scores to be placed on the Leaders List. For example, if the particular tournament game was preprogrammed to have three winners (e.g., first, second and third place), the memory 28 stores three names and their respective scores and PINs. If the current player's score is less than the lowest score in the memory 28, the comparator 26 returns a signal to the processor 14 to return the display 18 to an Attract Mode, or the like. If the current player's score is greater than the lowest score in the memory, the comparator 26 returns a signal to the processor 14 to cause the display 18 to present a Leaders List screen, as shown in FIG. 4. The Leaders List informs the current player of the names and scores of the current top players. The current player is prompted to enter his or her name into the video game machine 14 using a data input device 30. The data input device 30 may be an alphanumeric keypad (not shown) associated with video game machine 12, a touchscreen panel of the display 18 showing alphabetic characters, or another suitable device. After the player enters his or her name, the player is presented with a PIN Entry Screen and is prompted to enter a PIN using the data input device 30, as shown in FIG. 5. In FIG. 5, the data input device 30 is the touchscreen panel of the display 18. After the player enters the PIN, the player is prompted to reenter the PIN to confirm the number. The PIN is used by the system to verify a player's identity when a winner claims a prize at the conclusion of the tournament. After the current player has completed the name and PIN entry process, the player with the lowest score in the memory 28 is deleted, and the current player's name, score and PIN are added to the memory 28. The current data in the memory 28 is used to generate the Leaders List.

When a tournament begins, the comparator 26 may optionally be programmed to enter names and scores in the memory 28 only if the new scores are greater than a predetermined value. The predetermined value is a score which is high enough to be a potentially winning score based on past experience with the game. If the comparator is not programmed with this feature, the first three players in the tournament would automatically be placed on the Leaders List (in a tournament with three winners), even if they are virtually certain to be eliminated from the Leaders List by subsequent players. Players 4, 5, 6, . . . , etc . . . , who play early in the tournament and who achieve relatively low scores could also end up on the Leaders List even though they too have no reasonable chance of winning. To avoid providing false hopes to early players and to reduce the time that a machine is tied up needlessly registering players on a Leaders List, the comparator 26 may be set to the predetermined value for entering new names at the beginning of a tournament. Once the memory 28 is filled by players who exceed the predetermined value, all subsequent scores are compared only to those already in the memory 28 (as described above) to determine if the current player should replace a player already in the memory 28.

At the conclusion of the tournament, as determined by the tournament duration selector/memory 22, win selector 32 selects one or more tournament winners from the scores stored in the memory 28. If the number of memory locations in the memory 28 is the same as the number of potential winners (as will typically be the case), all of the names in the memory 28 become winners. The win selector 32 assigns tournament prizes to the winners using the amounts in the prize pool 24 and the percentage values to be assigned to each place. For example, if the prize pool has built up to \$100, and the percentage breakdowns are first place=50%, second place=30%, and third place=20%, the player with the highest score wins \$50, the player with the next highest score wins \$30 and the remaining player wins \$20. If the prize pool is calculated in non-monetary amounts, a similar proportional calculation is performed on the non-monetary units in the prize pool. The names of the winning players are stored in a winner memory 34, along with the name of the tournament, the players's respective scores, PINs and winning amounts, and an indication of whether the prize was claimed. The locations in the memory 28 associated with the tournament that just ended is cleared and may be used for the next tournament.

Figure 6:
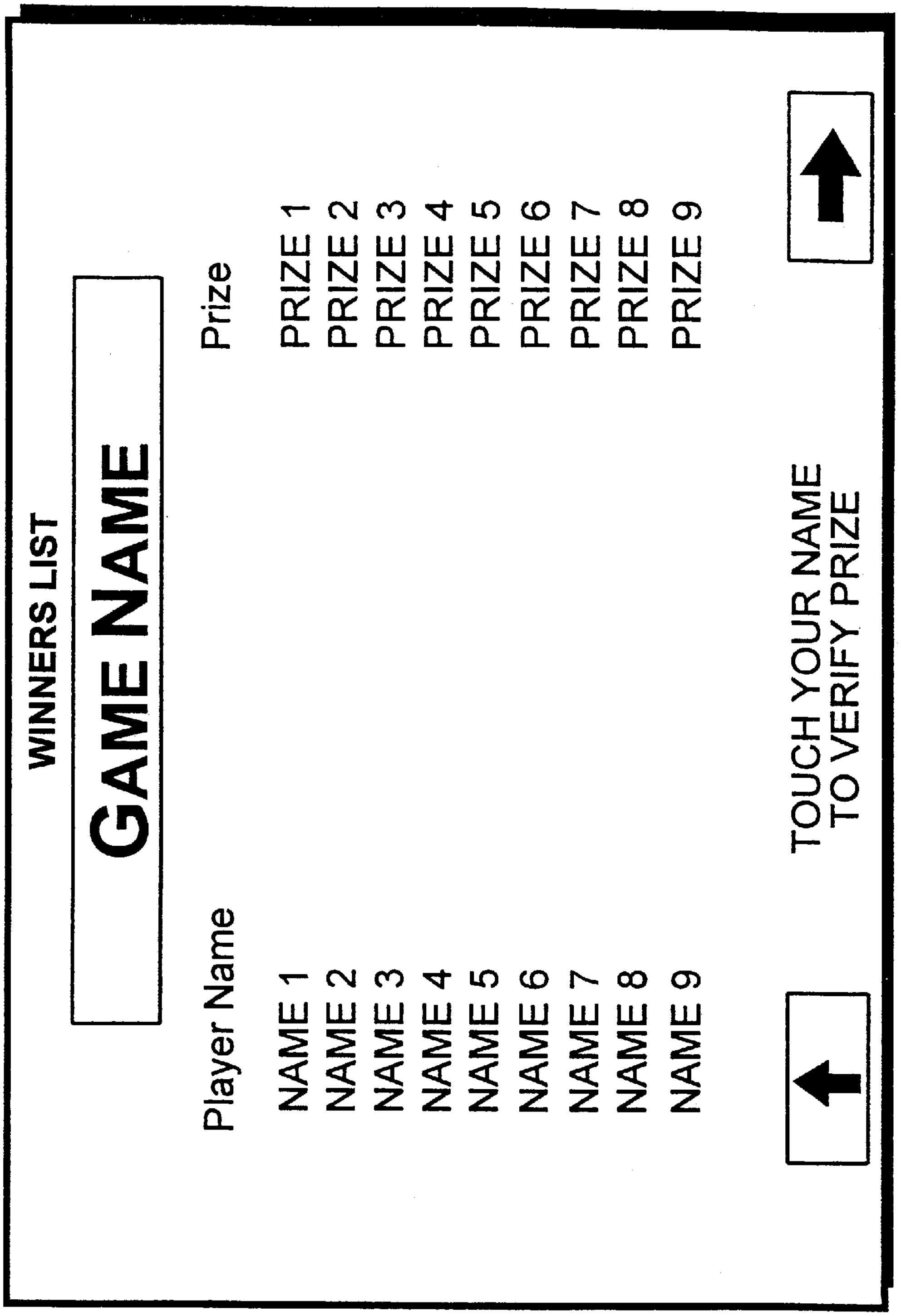
FIG. 6 is a Winners List display screen for the tournament system of FIG. 1.

The winner memory 34 is used to generate a Winners List display for viewing on the display 18 whenever the video game machine 12 is in the Attract Mode, or in response to pressing an appropriate button on the machine 12. A sample Winners List display is shown in FIG. 6. The Winners List may include all of the winners of recently completed tournaments, or may include only the winners for a particular tournament. Repeatedly touching the "Up Arrow" button will display the prize list for each game that has a prize or prizes to be awarded.

Figure 7:
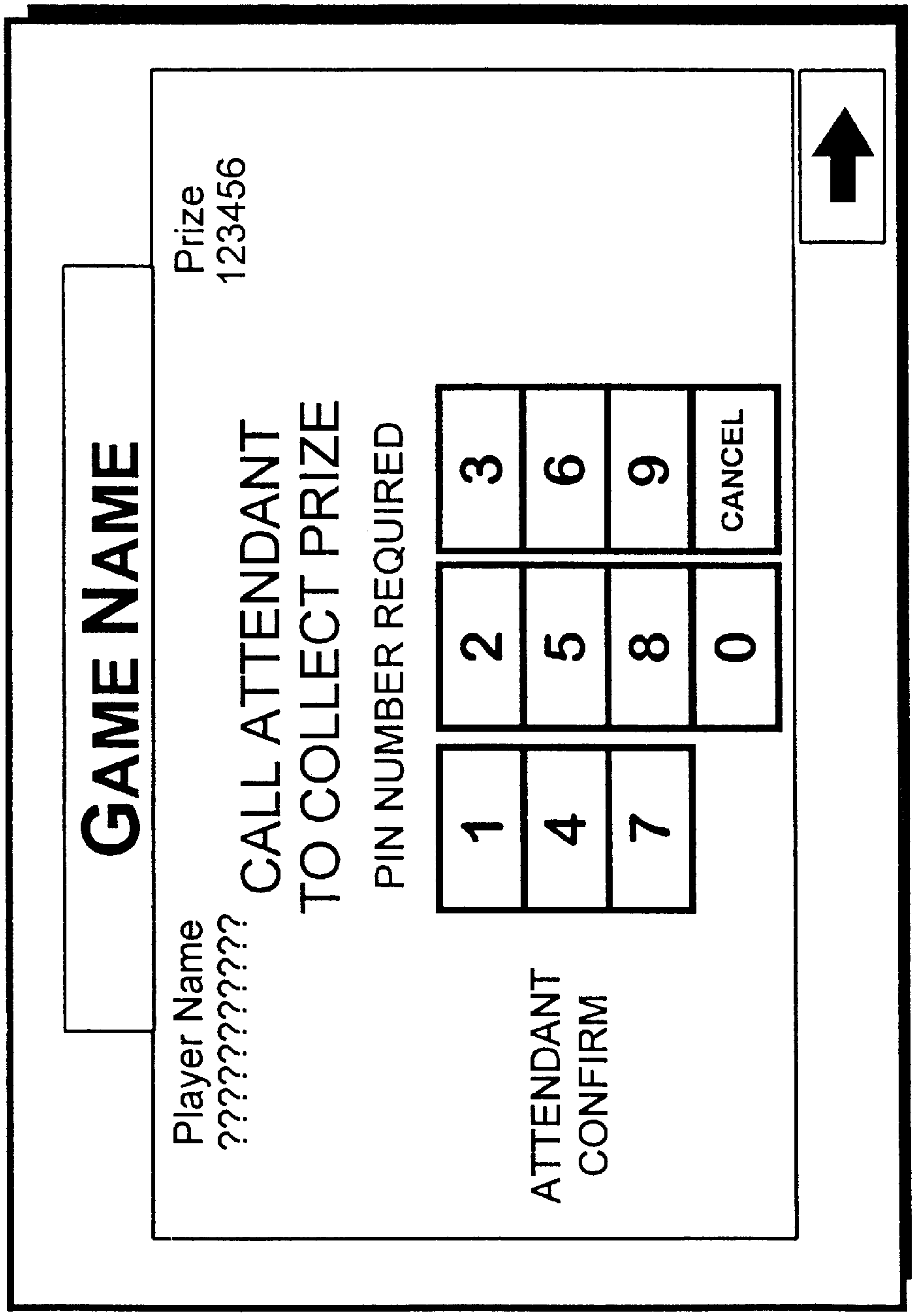
FIG. 7 is an Attendant display screen for the tournament system of FIG. 1.
Figure 8:
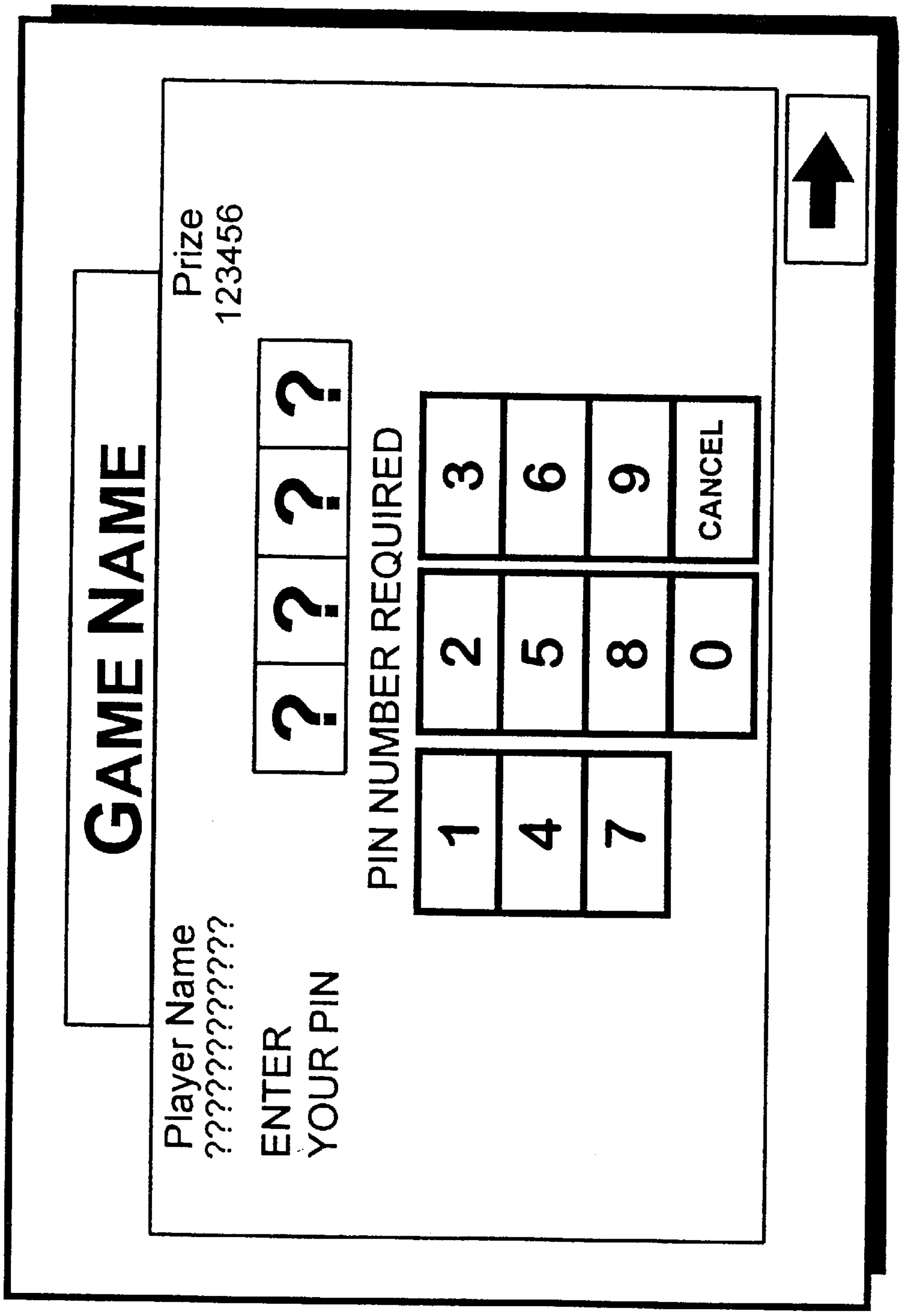
FIG. 8 is a Player Identity Verification display screen for the tournament system of FIG. 1.

At the completion of a tournament, players who made it onto the Leaders List will likely return to the video game machine 12 to see if he or she made it onto the Winners List, and is thus eligible to claim a prize. If a player notices his or her name on the Winners List of FIG. 6, the player selects his or her name from the display 18, and the Winners List display screen is replaced by an Attendant display screen, shown in FIG. 7. The Attendant display screen prompts the player to call an attendant to collect the prize. The attendant enters a preassigned PIN into the video game machine 12 by using the touchscreen panel of the display 18, or other suitable input device. An attendant identity verifier 36 compares the entered PIN to a listing of preassigned PINs. If the attendant PIN is valid, the Attendant display screen is replaced by a Player Identity Verification display screen, shown in FIG. 8. The player is prompted to enter the PIN that he or she used when originally placed on the Leaders List by using the touchscreen panel of the display 18, or other suitable input device. As the PIN is entered, each key entry will change the "?" to an "*". After the last digit of the PIN is entered, a player identity verifier 38 compares the newly entered PIN to the originally entered PIN. If the numbers match, the player is awarded the prize. To confirm the award, the display 18 may flash a message such as "CONGRATULATIONS WINNER". Players get three chances to enter the correct PIN, or the machine will void the award sequence and return to normal operation. As an optional step, the attendant or player may be required to press a "PRIZE AWARDED" button to confirm that the prize awarding sequence is properly completed. Upon completion of the prize awarding sequence, the winner memory 34 is updated to reflect that the prize was awarded for that player. Also, an entry is made in an attendant audit trail 40 indicating the attendant who verified and authorized the awarding of a prize for each player who claimed a prize. The audit trail 40 may be used to follow up on any problems that arise regarding payment of prizes. The display 18 then returns to a normal operating mode, such as an Attract Mode. As discussed above, the attendant physically awards the prize, or directs someone else in the facility to do so. Unclaimed prizes remain in the winner memory 34 (and thus on the Winners List) until claimed, or until such entries are cleared from the winner memory 34 by the facility or game operator.

GAME SETUP MODE

Figure 9:
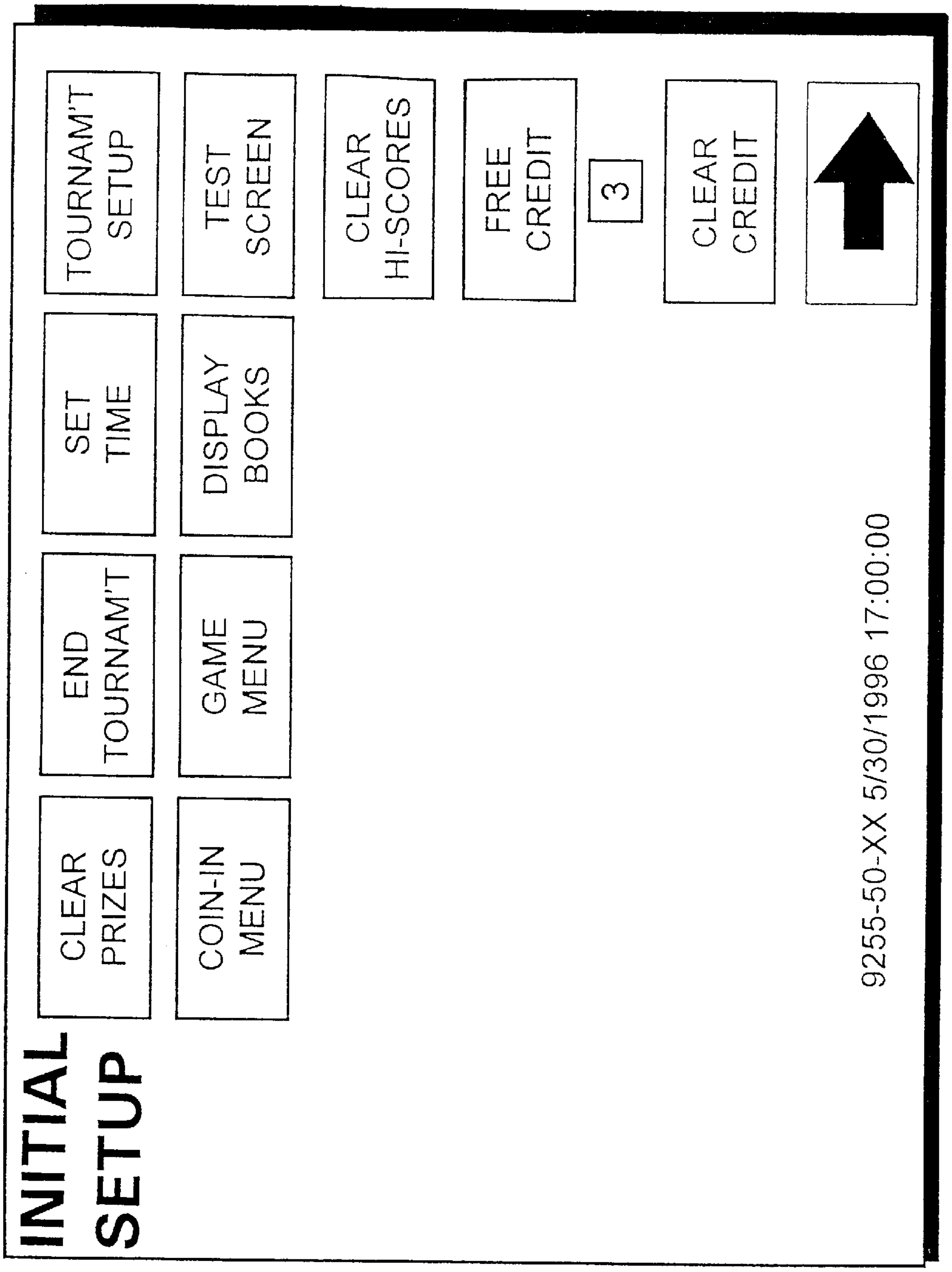
FIG. 9 is an Initial Setup display screen for a game machine used for the tournament system of FIG. 1.
Figure 10:
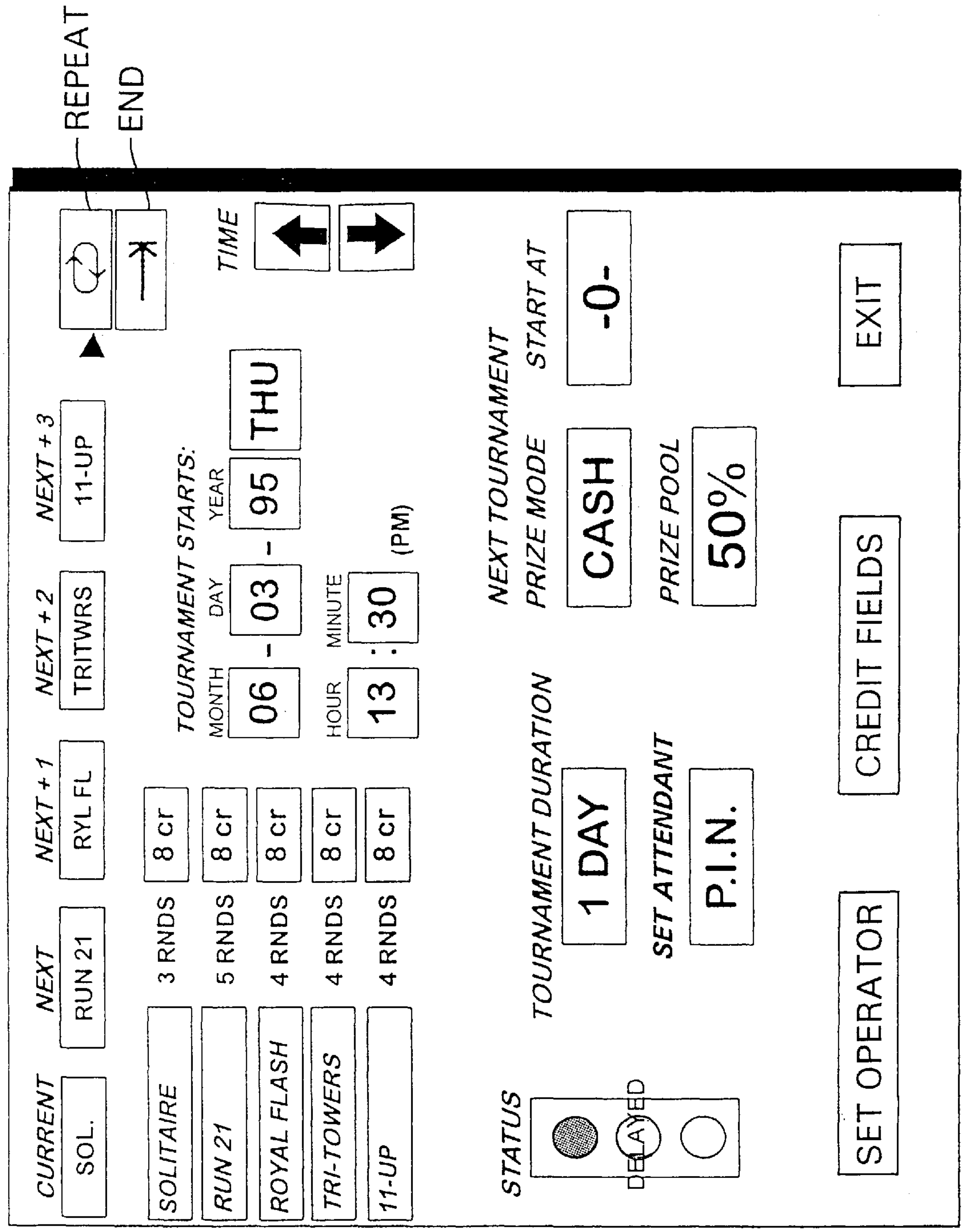
FIG. 10 is a Tournament Setup display screen for the tournament system of FIG. 1.
Figure 11A:
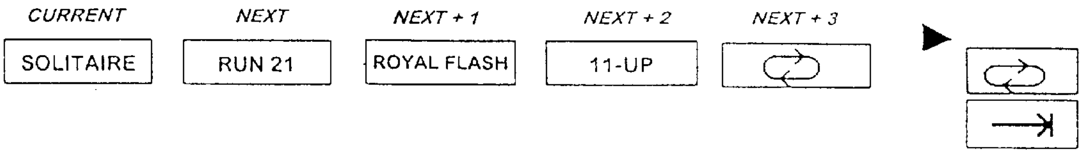
FIGS. 11(*a*)–11(*d*) are four examples of programmable tournament sequences for a game machine.
Figure 11B:
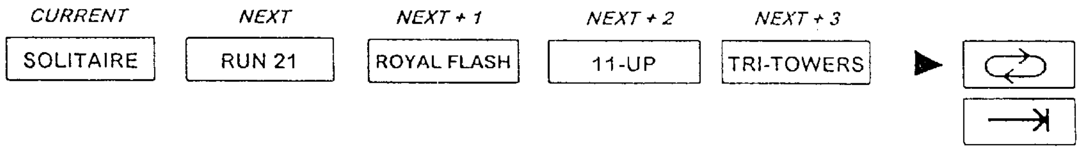
Figure 11C:
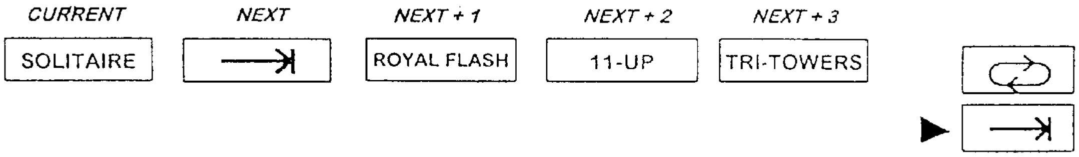
Figure 11D:
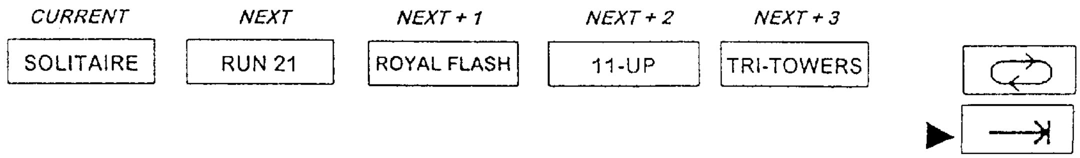
Figure 12:
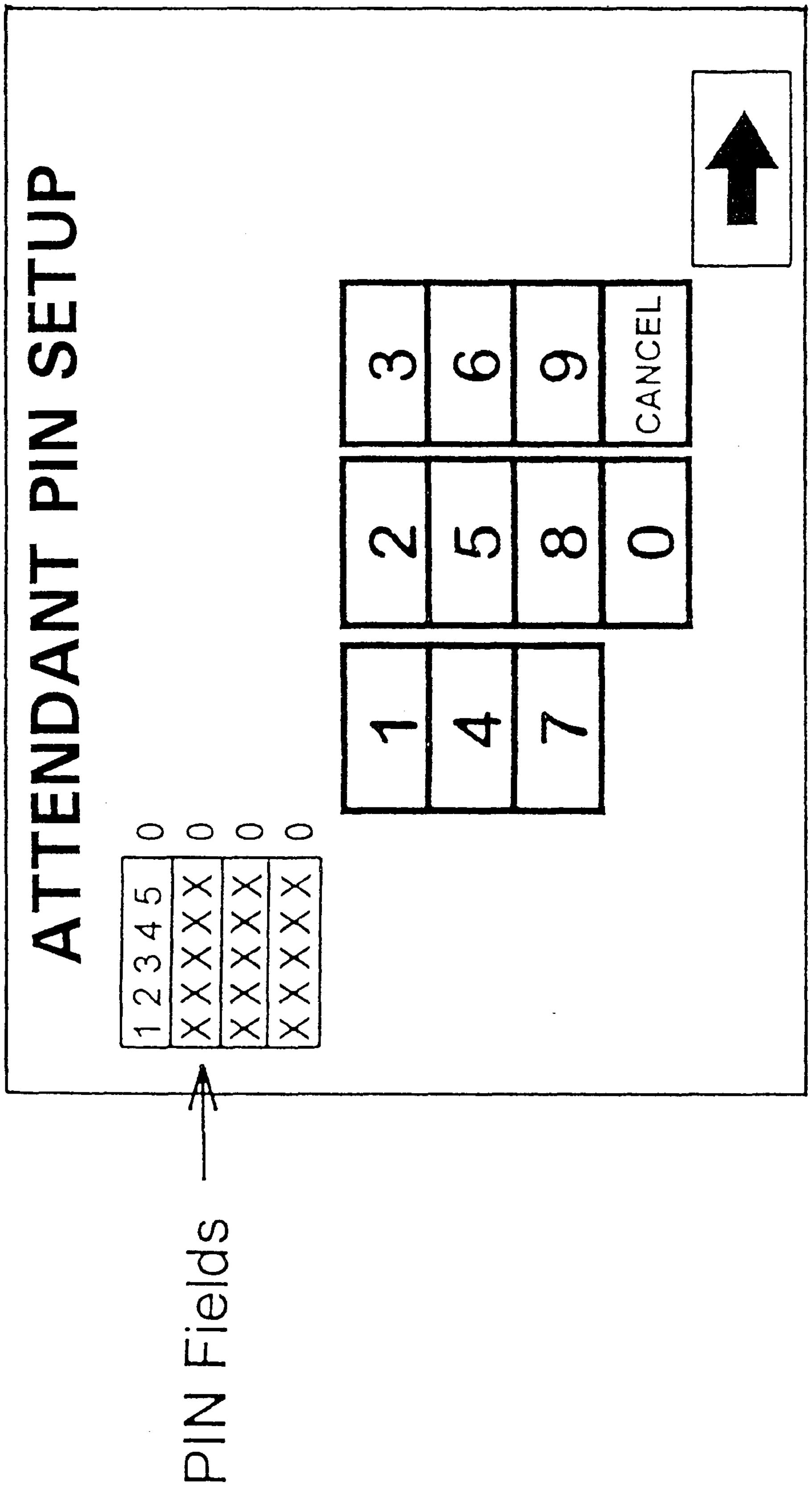
FIG. 12 is an Attendant Pin setup display screen for the tournament system of FIG. 1.

FIGS. 9–12 show sample display screens for setting up tournaments and parameters of tournaments. FIG. 9 shows an Initial Setup display screen. FIG. 10 shows a Tournament Setup display screen. FIGS. 11(*a*)–11(*d*) shows four examples of programmable tournament sequences. FIG. 12 shows an Attendant Pin setup display screen. A touchscreen panel of the display 18 is used for inputting selections associated with the setup display screens of FIGS. 9–12.

To enter the Initial Setup display screen of FIG. 9, a button is pressed behind the cashbox of the video game machine 18, or in some other hidden location. Alternatively, the setup screen may be accessed by entering a secret alphanumeric code into the machine 18.

The Initial Setup display screen allows access to the following functions:

Coin-in Menu: Enters the coin/credit setup screen

Game Menu: Enters the game menu selection screen

Display Books: Enters the bookkeeping statistics screen

Test Screen: Enters the touchscreen calibration test

Clear Hi-Scores: Clears all game hi-scores (not tournament hi-scores)

Free Credit: Adds credit without using coin switch. Free credits are listed separately in the books screen, and not registered on the meter Clear Credit: All credits in the machine are erased Exit Setup: Return to the attract mode or game menu Clear Prizes: Clears all names from the Winners List End Tournament: Immediately ends the current tournament and begins the next Set Time: Allows the operator to set the time and date Tournament Setup: Enters the tournament setup screen An example of a coin/credit setup screen is provided in allowed U.S. application Ser. No. 08/516,809, filed Aug. 18, 1995, entitled "System for Creating Menu Choices of Video Games on a Display".

If the Tournament Setup button is pressed on the Initial Setup display screen, the Tournament Setup display screen of FIG. 10 appears.

The Tournament Setup display screen allows access to the following functions:

| | |
|---|---|
| Current, Next, Next +1 . . . | Active Tournament Sequence. These list the "Current" tournament (Tournament 1), "Next" tournament (Tournament 2), "Next+1" tournament (Tournament 3), "Next+2" tournament (Tournament 4) and "Next+3" tournament (Tournament 5). The current tournament is locked in once credits have been played. |

-continued

| | |
|---|---|
| Solitaire, Run 21, 11-UP Royal Flash & Tri Towers | Eligible Tournament Games. Touch one of the games and then touch one of the Current, Next, Next+1, Next+2 or Next+3 box to enter the game into the desired Active Tournament position. |
| Repeat | When enabled, the programmed tournaments will repeat in sequence. To enable, touch REPEAT after entering all five tournament games; if entering fewer than five tournaments, touch REPEAT, then touch the desired Active Tournament box to repeat the preceding sequence. See FIGS. 11(a) and 11(b) examples. |
| End | When enabled, the tournament sequence ends after the last tournament. To enable; touch END; if entering fewer than five tournaments, touch END and then touch the next vacant Active Tournament box (where the preceding tournaments will end). See FIGS. 11(c) and 11(d) for examples. |
| Change Time/ Date | To set the ending date/time, touch the month, day, year or time field and touch the arrows under "TIME" to move the month, day, year or time up or down. The time can be set in one half hour increments. The tournament ending time/date can be changed at any time, but cannot be changed to a time/date previous to the current time/date. |
| Tournament Duration | Sets the duration time for all tournaments. Toggles from 3 hours to 1, 2, 3, 4, 5 and 6 days, and 1, 2, 3 and 4 weeks. |
| Set Attendant | Calls up the ATTENDANT PIN SETUP screen. Up to four, 5-digit attendant PINs can be programmed into the game. An attendant must enter a "PIN number" for any prizes to be awarded. See FIG. 12. |
| Prize Mode | Can be set to "POINTS" or "CASH", depending on the type of tournament. If set to "POINTS", the points are equal to 100 times the number of credits played. If set to "CASH" see "Prize Pool" below. Prize mode becomes locked, for the current tournament, once credits have been played. You can, however, change the settings for an upcoming tournament. |
| Prize Pool | Prize Pool sets the percentage of the tournament's total coin drop to be used for the tournament prizes. If set to "Points" mode, the percentage will toggle from 25% to 100% in 5% increments. If it is set to "Cash" mode, the percentage will toggle from 25% to 75% in 5% increments. Default value is 50%. Some states prohibit the operation of monetary tournament. In these states "Prize Pool" must be set to "Points" mode. |
| Start At | Allows the operator to start a tournament with money/points already in the Prize Pool. The pool will increase as players deposit coins. The possible "Start At" cash values are $0, $5, $10, $15, $20, $25, $30, $35, $40, $45, $50, $60, $70, $80, $90 and $100. Multiply by 400 for Start At point values.) |
| Status | To be set after completing the tournament setup. Status can be toggled to "RUNNING," "DELAYED" or "STOPPED" by touching any part of the status "traffic light." If set to "RUNNING" the current tournament will start upon returning to the Game Menu Screen. If set to "DELAYED" the current tournament will start at the programmed time and date. When set to "RUNNING" or "DELAYED" the tournament settings (i.e., Prize Mode, Prize Pool and Start At fields) are LOCKED for the current tournament. Also, once credits are played the word "LOCKED" appears and the "Prize Mode," "Prize Pool" and "Start At" fields are locked for the current tournament. When the status is "locked," any changes to these fields will affect the next tournament(s) only. Tournament duration is adjustable at any time. |
| Credit Fields | The credit fields are located next to the eligible tournament games. Touching this field will toggle the credits (from 4 to 20 in steps of 2) needed to play a given tournament. The credit field will display "dollars" instead of credits, depending on the setting of DIP switches associated with the game machine. |
| Exit | Returns you to the Initial Setup Screen. |

An example of recommended default prices for the Credit Fields of the tournament games shown in FIG. 10 is as follows:

| | |
|---|---|
| Solitaire tournament game: | 3 rounds for 8 credits ($2.00) (standard game: 1 round for 1 credit) |
| Run 21 tournament game: | 5 rounds for 8 credits ($2.00) (standard game: 3 rounds for 1 credit) |
| Royal Flash tournament game: | 4 rounds for 8 credits ($2.00) (standard game: 2 rounds for 1 credit) |
| Tri-Towers tournament game: | 4 rounds for 8 credits ($2.00) (standard game: 2 rounds for 1 credit) |
| 11-UP tournament game: | 4 rounds for 8 credits ($2.00) (standard game: 2 rounds for 1 credit) |

As noted above, a tournament game is played in the same manner as a standard (non-tournament) game. However, a tournament game consists of an extended version of the standard game. For example, the standard Solitaire game may have only one round and may cost one credits, while the tournament game offers three rounds for eight credits.

FIGS. 11(*a*)–11(*d*) show examples of four different programmable tournament sequences for a video game machine 12 that has a plurality of games in its game memory 16. In the example shown in the figures, a series of five consecutive tournaments can be set at one time and may be set to repeat in sequence. Any or all of the five tournament games may be used in the sequence. If the video game 12 is dedicated to playing only a single game, the tournament sequence will be set to either continuously run the tournament using the single game, or to run the tournament for only a discrete number of times.

FIG. 12 shows the Attendant Pin setup display screen which appears when "Set Attendant" is selected on the display screen of FIG. 11. The number located to the right of the PIN records the number of times the PIN was entered since the last time CURRENT BOOKS was cleared. To enter an Attendant PIN, touch the PIN field that you want to use, to make it active. Next, enter the desired PIN using the keypad. Pressing "CANCEL" will reset the PIN to "XXXXX" or will delete the PIN in the active field. All 5 digits must be entered.

DETAILS OF BOOKKEEPING STATISTICS

As discussed above, a bookkeeping statistics screen is entered by selecting "DISPLAY BOOKS" from the Initial Setup display screen. The bookkeeping statistics screen allows access to CURRENT BOOKS and LIFETIME BOOKS. CURRENT BOOKS tracks the following tournament statistics:

- Tournament Play: Records the total number of credits played in the Tournament Mode (since the last time CURRENT BOOKS was cleared)
- Unclaimed Prizes: Records the total amount of credits in unclaimed prizes
- Claimed Prizes: Records the total number of credits awarded in tournament prizes (since the last time CURRENT BOOKS was cleared)

Lifetime Books tracks the following tournament statistics:

- Tournament Play: Records the total number of credits played in the Tournament Mode (since the last time LIFETIME BOOKS was cleared)
- Paid Without Pin: Records the total number of prizes awarded without a player PIN number (see variation 2 below)

Clearing the CURRENT BOOKS screen will clear all names from the Winners List who have been awarded prizes.

Other variations of the present invention, without limitation, are listed below.

(1) The tournament system may be implemented without requiring an attendant to verify a winner. After a player selects his or name from a Winners List, the Attendant Screen is skipped and the Player Identity Verification Screen appears automatically. If the player successfully verifies his or her identity, the video game machine 12 either prints out a check or a piece of paper which can be brought to someone for payment, outputs a signal for transferring funds automatically to a player's account or to a player card inserted into the machine 12, or outputs cash like a slot machine.

(2) If a player has forgotten his or her PIN, the tournament system 10 may include the ability to bypass the Player Identity Verification Screen. The attendant must successfully verify himself or herself before this screen is bypassed. After attendant verification is completed, the attendant takes other measures to verify the identity of the player, such as by checking a driver's license or by verifying identity through another person. Next, the attendant pushes a special button, such as a physical hidden setup button located behind the machine 12. In response, the "CONGRATULATIONS WINNER" message appears on the display 18 and the prize awarding process continues as described above.

(3) A plurality of stand-alone video game machines 12 may be linked in a networked manner to increase the potential pool of tournament participants.

(4) The prize pool may be preset fixed amount set by the game operator or proprietor of the facility, as opposed to being a percentage of the coin drop added to a seed amount. The prize pool may be merchandise, instead of cash.

(5) In the embodiment of the invention described above, only one tournament game can be played during each tournament period. Alternatively, the system may be programmed to allow a plurality of different tournament games to be played during each tournament period.

(6) In some games, the lower the score, the better the player has performed. Accordingly, the term "high scorer", "highest total player score", "high scoring player", and a "sufficiently high score" is defined herein to mean the "best" score. Thus, in a game wherein the goal is to achieve the lowest score, a "high scorer" as defined herein is a player who achieves a sufficiently low score compared to other players.

(7) Player names may be substituted by other forms of player identities. Since the player identification number functions to verify player identity, the player need not enter his or her real name into the Leaders List.

(8) In the preferred embodiment of the invention, a player who achieves a sufficiently high score to be posted on the Leaders List enters his or her name and PIN directly into the video game machine 12. However, to conduct a tournament, it is only necessary that the player enter some form of "player identification information" into the machine 12. The player identification information may be a name and/or a PIN, or the like. It is not necessary to enter both a name and a PIN. If a player subsequently sees his or her name or PIN on the Winners List, player identity verification can occur manually, instead of through machine 12. For example, a player can approach an attendant and present proof of identity to claim a prize. Alternatively, a player can register with a tournament by providing a secret PIN and can verify identity by informing the attendant of the PIN when claiming a prize.

(9) Instead of prompting a player to enter a name and PIN upon a determination that the current player is a high scorer, the video game machine 12 may be programmed to prompt a player to enter his or her name and PIN before the game begins and to temporarily store the information. If a player's total score is sufficiently high to place the player on the Leaders List, the name and PIN is then automatically stored in the memory 28. Otherwise, the information is erased.

Figure 13:
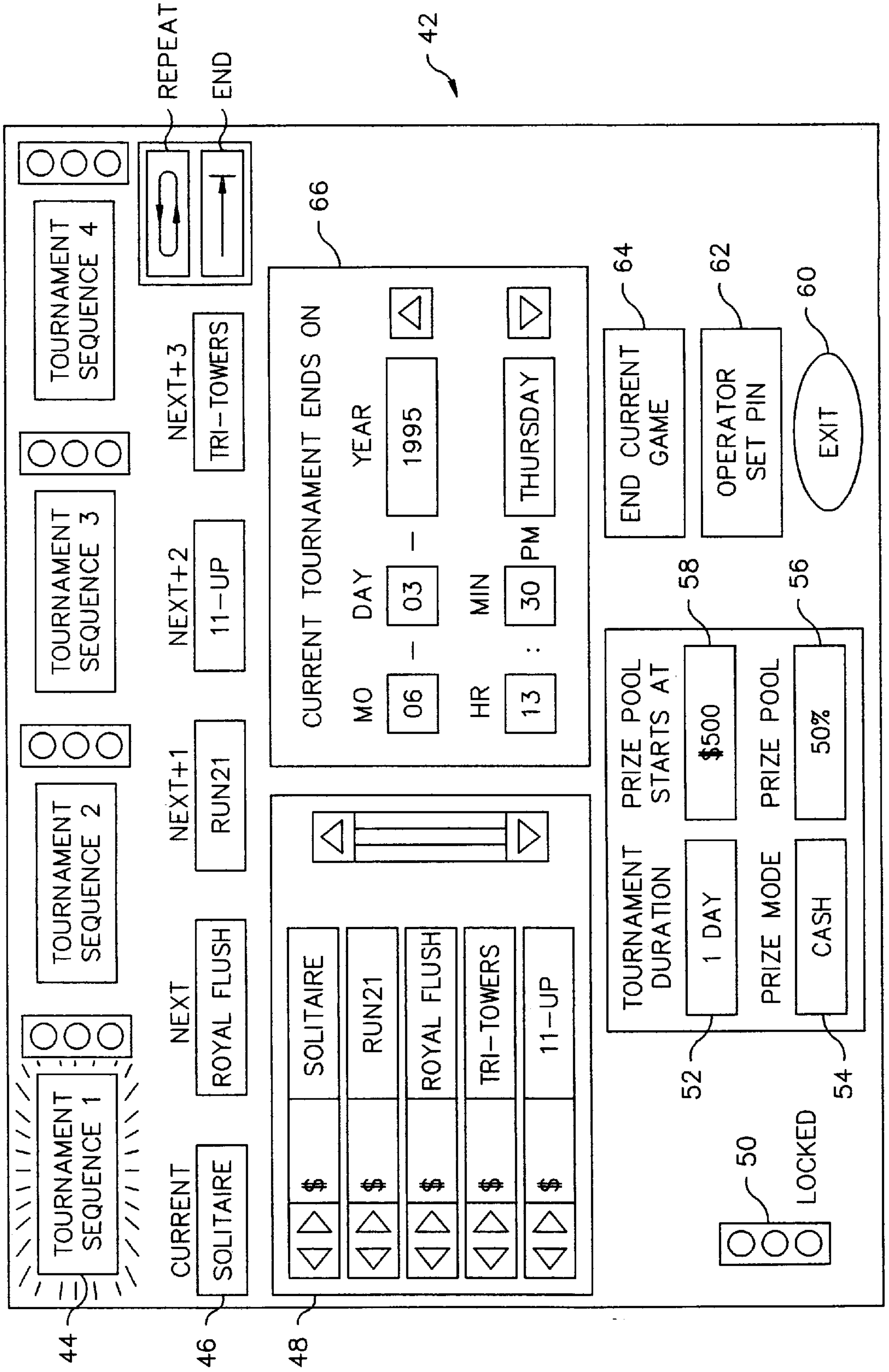
FIG. 13 is a Tournament Setup display screen for an alternative embodiment of the tournament system of FIGS. 1–12 wherein a plurality of tournaments are simultaneously conducted.

FIG. 13 shows a Tournament Setup display screen 42 for use in an alternative embodiment of the present invention. In this embodiment, a plurality of tournament sequences are programmed into the game machine. The screen 42 in FIG. 13 allows the operator to run up to four simultaneous tournament sequences. The sequences are simultaneously implemented. Thus, a plurality of tournaments may be selectable at any given time, depending upon the start and end times of the respective tournaments.

Consider the following example wherein two tournament sequences of three tournament games are programmed, and each tournament starts and ends at the same time.

| | TIME PERIOD | | |
|---|---|---|---|
| | CURRENT | NEXT | NEXT+1 |
| SEQUENCE 1: | Game $1_1$ | Game $2_1$ | Game $3_1$ |
| SEQUENCE 2: | Game $1_2$ | Game $2_2$ | Game $3_2$ |

In this example, the tournament player may choose to play either Game $1_1$ or Game $1_2$ in the current time period, Game $2_1$ or Game $2_2$ in the next time period, and Game $3_1$ or Game $3_2$ in the next+1 time period, thereby enhancing the tournament game options available to the player. Separate prize pools, Leaders Lists and Winners Lists are kept for each of the six tournaments. Thus, the implementation of each of tournament in the plural sequence embodiment is the same as described in the embodiment of FIGS. 1–12. Plural Leaders Lists and Winners Lists for each tournament may be simultaneously displayed for each independent sequence, or the respective display screens may include scroll or selection inputs to allow the player to access the lists for the tournament of interest. If two tournaments for the same game were programmed in either the same or different sequences, the Leaders List and Winners List displays the respective tournament period for each game.

Figure 14:
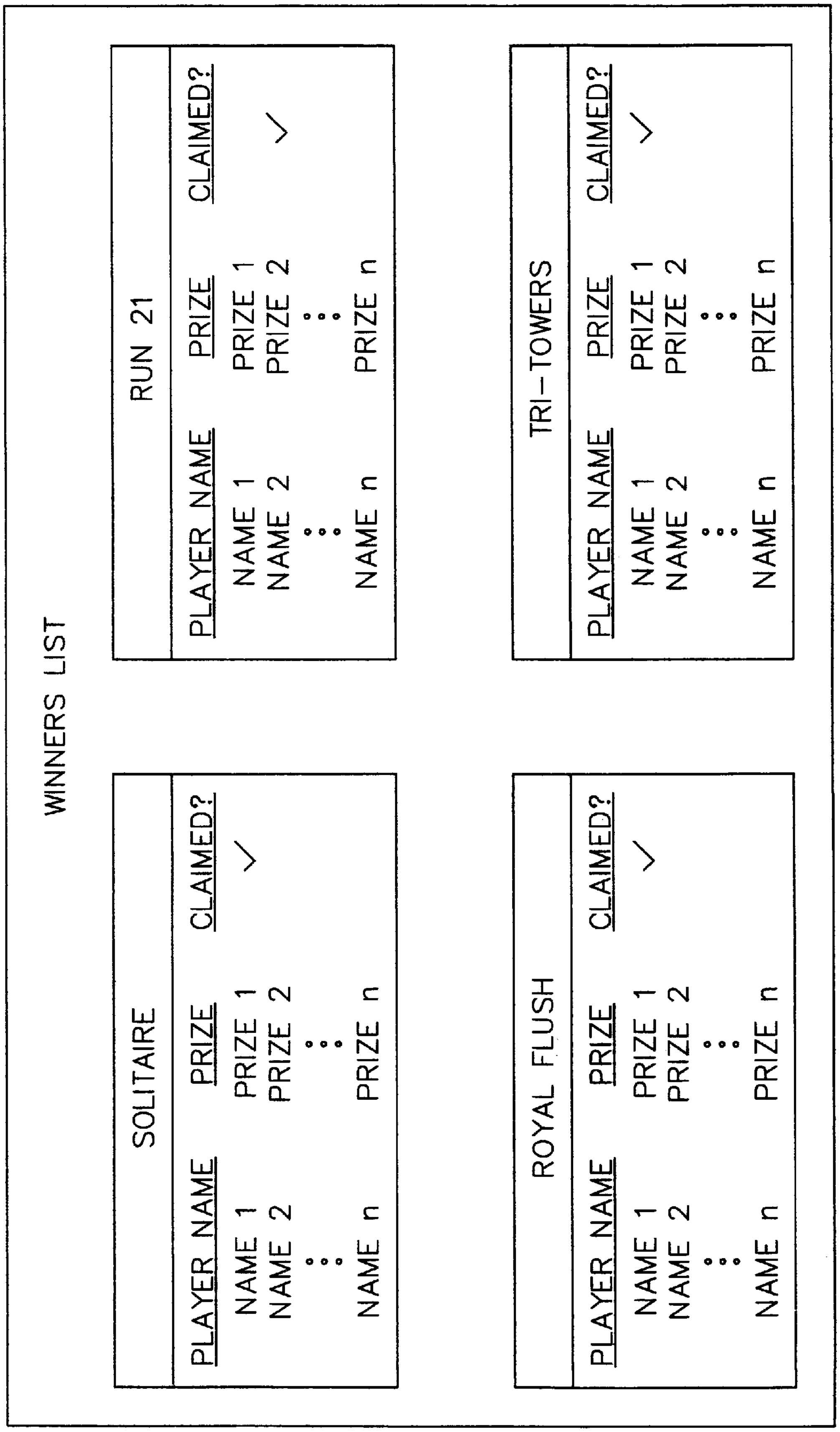
FIG. 14 is a Winners List display screen for the tournament system of FIG. 13.

FIG. 14 is a sample Winners List display screen for a tournament system of FIG. 13 which can be programmed to play four games, SOLITAIRE, RUN 21, ROYAL FLUSH and TRI-TOWERS. The display screen appears automatically during an Attract Mode, or in response to pressing an appropriate button on the machine, either before, during or after game play. The display screen is organized by game. The previous winners of each tournament in each of the sequences are consolidated and listed for the respective games. Once the free spaces on the display are exhausted, the names of the newest tournament winners replace the oldest names and/or the names of players who already claimed their prize.

Each tournament can be completely programmed, including the end time, duration and tournament prize pool, thereby providing the flexibility for a variety of promotional tournaments. Thus, the tournaments do not necessarily have matching time periods, such as in the example above. Each tournament can be further programmed to be a single, repeating tournament game (e.g., Game $1_1$, Game $2_1$ and Game $3_1$ may be the same game, in the example above) or a sequence of different games, which change for each tournament period.

If the Tournament Setup button is pressed on the Initial Setup display screen, the Tournament Setup display screen of FIG. 10 appears.

The Tournament Setup display screen 42 allows access to the following functions in a touch screen data entry format:

| | |
|---|---|
| Tournament Sequence (44) | Enter a programmed sequence of up to 5 tournament games. Touch a "Tournament Sequence #" to program the desired tournament sequence (each tournament sequence is programmed independently). |
| Tournament Game Sequence (46) | Touch a game field to select a game from the pull-down menu. Select REPEAT to have the programmed games repeat their sequence; select END to have the tournament games end after the programmed sequence. It is not necessary to fill in all of the game slots (i.e., CURRENT, NEXT, NEXT+1, etc.). For example, if it is desired to continuously repeat SOLITAIRE, then SOLITAIRE is placed in the CURRENT game slot, and REPEAT is selected. The REPEAT symbol will appear in the NEXT game slot. Any games entered into NEXT +1, NEXT +2 or NEXT+3 game slots will not be played. To repeat two game sequences, the operator fills in CURRENT and NEXT game slots, and selects REPEAT. In this example, the REPEAT symbol will appear in the NEXT +1 game slot. |
| Tournament Cost Fields (48) | Touch an individual game to change the tournament game cost. Use the up and down arrows to view all available tournament games. |
| Status Light (50) | This is the last step for programming a tournament sequence. Status can be toggled to "RUNNING," "DELAYED" or "STOPPED" by touching any part of the status "traffic light." "RUNNING" means the current tournament will start upon returning to the Game Menu Screen: "DELAYED" means the current tournament will start at the programmed time and date. When set to "RUNNING" or "DELAYED" the tournament settings are LOCKED for the current tournament. When the status is "LOCKED" any changes to these fields will effect the next tournament(s) only. |
| Tournament Duration (52) | Sets duration for tournament games in the displayed Tournament Sequence. |
| Prize Mode (54) | Sets to POINTS or CASH, depending on tournament type. |
| Prize Pool (56) | Sets the percentage of the tournament's total coin drop to be used for tournament prizes. |
| Prize Pool Starts At (58) | Allows the operator to start the tournament with cash/points already in the Prize Pool. The pool increases as players deposit coins. |
| Exit (60) | Exits to the Setup Screen. |
| Operator Set PIN (62) | Displays the Set Attendant PIN keypad. The operator can set up to four PINS to be used by attendants for awarding prizes. |
| End Current Game (64) | Ends the current tournament game. |
| Time and Date Fields (66) | Touch the field you want to change and adjust the value using the UP and DOWN arrows. |

The display screen 42 thus functions as the means for preprogramming the sequence(s) of tournament games and tournament periods. The software for implementing the programmed functions would be well understood by an artisan, and thus is not described in further detail herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An automated tournament system for use with a game machine, the game machine implementing the system when placed in a tournament mode, the system comprising:

(a) a plurality of tournament games playable by a plurality of players on the game machine, each of the plurality of tournament games generating a total player score upon completion of game play, the player scores being used to determine the tournament winners;

(b) means for preprogramming at least one sequence of tournament games from the plurality of tournament games; and (c) means for programming a tournament period for each tournament game, the preprogrammed tournament game for each sequence being playable during the programmed tournament period for the respective sequence.

2. A system according to claim 1 wherein a plurality of sequences of tournament games are preprogrammed to run simultaneously.

3. A system according to claim 1 further comprising:

(d) means for preprogramming the at least one sequence to either continuously repeat or to end after the last tournament in the sequence is completed.

4. A system according to claim 1 further comprising a non-tournament mode, at least some of the plurality of tournament games being playable in the non-tournament mode.

5. A system according to claim 1 wherein only a single tournament game is playable for each sequence within the at least one sequence of tournament games.

6. A method of conducting automated tournaments in a game machine, the game machine implementing the tournaments when placed in a tournament mode, the game machine including a plurality of tournament games playable by a plurality of players on the game machine, each of the plurality of tournament games generating a total player score upon completion of game play, the player scores being used to determine the tournament winners, the method comprising:

(a) preprogramming at least one sequence of tournament games from the plurality of tournament games; and (b) programming a tournament period for each tournament game, the preprogrammed tournament game for each sequence being playable during the programmed tournament period for the respective sequence.

7. A method according to claim 6 wherein step (a) includes preprogramming a plurality of sequences of tournament games to run simultaneously.

8. A method according to claim 6 further comprising:

(c) preprogramming the at least one sequence to either continuously repeat or to end after the last tournament in the sequence is completed.

9. A method according to claim 6 wherein only a single tournament game is playable for each sequence within the at least one sequence of tournament games.

* * * * *

UNITED STATES PATENT AND TRADEMARK OFFICE

CERTIFICATE OF CORRECTION

PATENT NO. : 6,082,887 C1
APPLICATION NO. : 90/007021
DATED : October 10, 2006
INVENTOR(S) : Peter Feuer et al.

It is certified that error appears in the above-identified patent and that said Letters Patent is hereby corrected as shown below:

Title Page, Item (73):

The assignee should read -- Merit Industries, Inc., Bensalem, PA (US) --

Signed and Sealed this

Twenty-sixth Day of December, 2006

JON W. DUDAS
*Director of the United States Patent and Trademark Office*

US006082887C1

(12) EX PARTE REEXAMINATION CERTIFICATE (5556th)
United States Patent
Feuer et al.

(10) Number: US 6,082,887 C1
(45) Certificate Issued: Oct. 10, 2006

(54) GAME MACHINE WITH AUTOMATED TOURNAMENT MODE

(75) Inventors: Peter Feuer, Rydal, PA (US); John W. Houriet, Jr., Yardley, PA (US); James R. Stelzer, Bensalem, PA (US); Kevin A. Hassan, Mountainside, NJ (US); Jeffrey D. Karn, Warrington, PA (US)

(73) Assignee: Madison Capital Funding LLC, Chicago, IL (US)

Reexamination Request:
No. 90/007,021, Apr. 29, 2004

Reexamination Certificate for:

| | |
|---|---|
| Patent No.: | **6,082,887** |
| Issued: | **Jul. 4, 2000** |
| Appl. No.: | **09/099,170** |
| Filed: | **Jun. 18, 1998** |

Related U.S. Application Data

(63) Continuation-in-part of application No. 08/717,152, filed on Sep. 20, 1996.

(51) Int. Cl.
*G06F 17/00* (2006.01)

(52) U.S. Cl. ........................................................ 700/91
(58) Field of Classification Search ............. 700/91–93; 463/40–42
See application file for complete search history.

(56) References Cited

U.S. PATENT DOCUMENTS

| | | | | |
|---|---|---|---|---|
| 5,637,844 A | | 6/1997 | Eiba | |
| 5,768,382 A | | 6/1998 | Schneier et al. | |
| 5,779,549 A | | 7/1998 | Walker et al. | |
| 5,816,918 A | | 10/1998 | Kelly et al. | |
| 5,855,516 A | | 1/1999 | Eiba | |
| 5,917,725 A | | 6/1999 | Thacher et al. | |
| 5,921,864 A | | 7/1999 | Walker et al. | |
| 5,970,143 A | | 10/1999 | Schneier et al. | |
| 6,039,648 A | | 3/2000 | Guinn et al. | |
| 6,224,486 B1 | | 5/2001 | Walker et al. | |
| 6,287,202 B1 | * | 9/2001 | Pascal et al. | 463/42 |

FOREIGN PATENT DOCUMENTS

| | | |
|---|---|---|
| DE | 35 22 136 A1 | 1/1986 |
| DE | 42 22 896 A1 | 1/1994 |
| DE | 44 02 419 A1 | 8/1995 |
| GB | 2184029 | 12/1989 |

* cited by examiner

*Primary Examiner*—Michael O'Neill

(57) ABSTRACT

A game machine includes a tournament mode for conducting automated tournaments. In the tournament mode, a plurality of tournament games are playable by a plurality of players on the game machine. Each of the plurality of tournament games generates a total player score upon completion of game play. The player scores are used to determine the tournament winners. One or more sequences of tournament games are preprogrammed from the plurality of tournament games, and a tournament period is programmed for each tournament game. The preprogrammed tournament game for each sequence is playable during the programmed tournament period for the respective sequence. A plurality of sequences of tournament games may be preprogrammed to run simultaneously. The tournament sequences may either continuously repeat or may end after the last tournament in the sequence is completed.

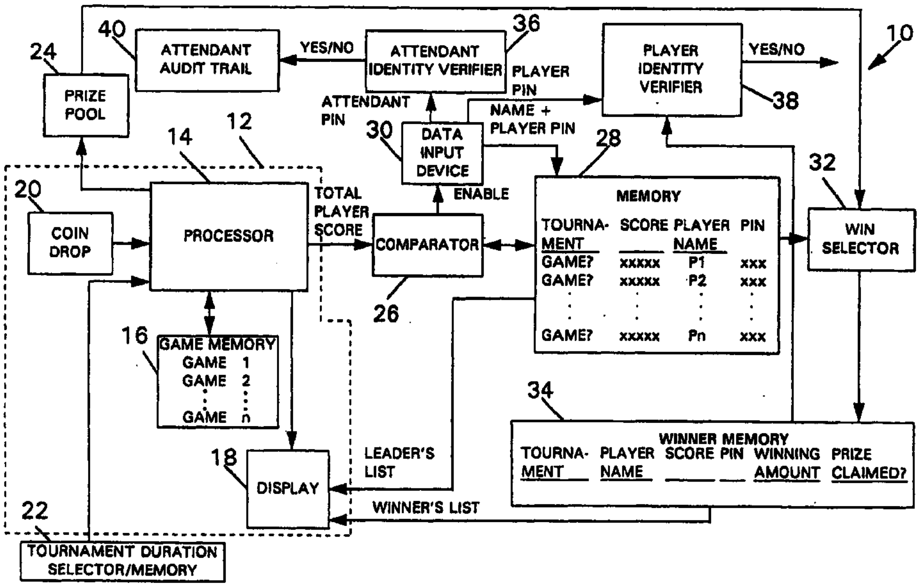

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 3–6, 8 and 9 is confirmed.

Claims 2 and 7 are cancelled.

New claims 10 and 11 are added and determined to be patentable.

*10. An automated tournament system for use with a game machine, the game machine implementing the system when placed in a tournament mode, the system comprising:*

*(a) a plurality of tournament games playable by a plurality of players on the game machine, each of the plurality of tournament games generating a total player score upon completion of game play, the player scores being used to determine the tournament winners;*

*(b) means for preprogramming a plurality of sequences of tournament games from the plurality of tournament games, each of the plurality of sequences of tournament games having a plurality of tournament games, at least two of the tournament games in each of the plurality of sequences of tournament games being different games; and*

*(c) means for programming a tournament period for the tournament games in each of the plurality of sequences, one of the at least two of the tournament games in each of the plurality of sequences being playable during the programmed tournament period for the respective sequence.*

*11. A method of conducting automated tournaments in a game machine, the game machine implementing the tournaments when placed in a tournament mode, the game machine including a plurality of tournament games playable by a plurality of players on the game machine, each of the plurality of tournament games generating a total player score upon completion of game play, the player scores being used to determine the tournament winners, the method comprising:*

*(a) preprogramming a plurality of sequences of tournament games from the plurality of tournament games, each of the plurality of sequences of tournament games having a plurality of tournament games, at least two of the tournament games in each of the plurality of sequences of tournament games being different games; and*

*(b) programming a tournament period for the tournament games in each of the plurality of sequences, one of the at least two of the tournament games in each of the plurality of sequences being playable during the programmed tournament period for the respective sequence.*

* * * * *

US006082887C2

(12) EX PARTE REEXAMINATION CERTIFICATE (7142nd)

United States Patent

Feuer et al.

(10) Number: US 6,082,887 C2

(45) Certificate Issued: Nov. 3, 2009

(54) GAME MACHINE WITH AUTOMATED TOURNAMENT MODE

(75) Inventors: Peter Feuer, Rydal, PA (US); John W. Houriet, Jr., Yardley, PA (US); James R. Stelzer, Bensalem, PA (US); Kevin A. Hassan, Mountainside, NJ (US); Jeffrey D. Karn, Warrington, PA (US)

(73) Assignee: Madison Capital Funding LLC, Chicago, IL (US)

Reexamination Request:
No. 90/008,180, Jul. 4, 2000

Reexamination Certificate for:

| | |
|---|---|
| Patent No.: | **6,082,887** |
| Issued: | **Jul. 4, 2000** |
| Appl. No.: | **09/099,170** |
| Filed: | **Jun. 18, 1998** |

Reexamination Certificate C1 6,082,887 issued Oct. 10, 2006

Certificate of Correction issued Dec. 26, 2006.

Related U.S. Application Data

(63) Continuation-in-part of application No. 08/717,152, filed on Sep. 20, 1996, now abandoned.

(51) Int. Cl.
*A63F 3/08* (2006.01)
*G07F 17/32* (2006.01)

(52) U.S. Cl. .......................................................... 700/91

(58) Field of Classification Search ..................... 700/91
See application file for complete search history.

(56) References Cited

U.S. PATENT DOCUMENTS

| | | | |
|---|---|---|---|
| 4,335,809 | A | 6/1982 | Wain |
| 4,467,424 | A | 8/1984 | Hedges et al. |
| 4,494,197 | A | 1/1985 | Troy et al. |
| 4,516,777 | A | 5/1985 | Nikora |
| 4,569,526 | A | 2/1986 | Hamilton |

(Continued)

FOREIGN PATENT DOCUMENTS

| | | | |
|---|---|---|---|
| EP | 0387862 | A1 | 3/1990 |
| WO | 9530872 | A1 | 11/1995 |
| WO | 9737737 | A1 | 10/1997 |

OTHER PUBLICATIONS

The National Amusement Network, "Network Game Installation and Troubleshooting Manual," Version 1.0, Apr. 1995.
The National Amusement Network, "Game Manufacturer Specification," Version 1.6, Oct. 1994.
The National Amusement Network, "NANI Admin System Help".
"National Amusement Network Manufacturers Round–Table," Oct. 19, 1995.
The National Amusement Network, "Game Manufacturer Specification," Version 1.3, Jun. 1994.
"NANI MultiMedia Network (Pilot) Screen Specifications," 1994.
The National Amusement Network, "Game Manufacturer Specification," Version 1.5.

(Continued)

*Primary Examiner*—Fred Ferris

(57) ABSTRACT

A game machine includes a tournament mode for conducting automated tournaments. In the tournament mode, a plurality of tournament games are playable by a plurality of players on the game machine. Each of the plurality of tournament games generates a total player score upon completion of game play. The player scores are used to determine the tournament winners. One or more sequences of tournament games are preprogrammed from the plurality of tournament games, and a tournament period is programmed for each tournament game. The preprogrammed tournament game for each sequence is playable during the programmed tournament period for the respective sequence. A plurality of sequences of tournament games may be preprogrammed to run simultaneously. The tournament sequences may either continuously repeat or may end after the last tournament in the sequence is completed.

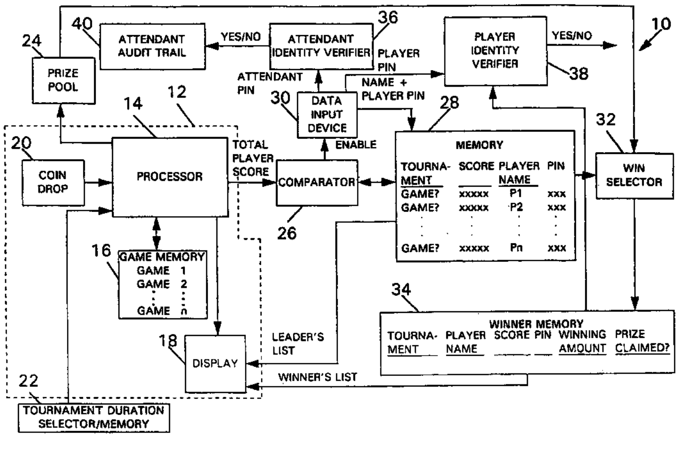

U.S. PATENT DOCUMENTS

| | | | |
|---|---|---|---|
| 4,666,160 | A | 5/1987 | Hamilton |
| 4,824,121 | A | 4/1989 | Beall et al. |
| 4,856,787 | A | 8/1989 | Itkis |
| 4,922,420 | A | 5/1990 | Nakagawa et al. |
| 5,018,736 | A | 5/1991 | Pearson et al. |
| 5,042,809 | A | 8/1991 | Richardson |
| 5,046,736 | A | 9/1991 | Bridgeman et al. |
| 5,083,271 | A | 1/1992 | Thacher et al. |
| 5,114,157 | A | 5/1992 | Kita |
| 5,259,613 | A | 11/1993 | Marnell, II |
| 5,263,723 | A | 11/1993 | Pearson et al. |
| 5,277,424 | A | 1/1994 | Wilms |
| 5,354,069 | A | 10/1994 | Guttman et al. |
| 5,415,416 | A | 5/1995 | Scagnelli et al. |
| 5,429,361 | A | 7/1995 | Raven et al. |
| 5,450,318 | A | 9/1995 | Mowers et al. |
| 5,531,453 | A | 7/1996 | Penston, III |
| 5,593,349 | A | 1/1997 | Miguel et al. |
| 5,655,961 | A | 8/1997 | Acres et al. |
| 5,741,183 | A | 4/1998 | Acres et al. |
| 5,746,656 | A | 5/1998 | Bezick et al. |
| 5,755,621 | A | 5/1998 | Marks et al. |
| 5,768,382 | A | 6/1998 | Schneier et al. |
| 5,779,549 | A | 7/1998 | Walker et al. |
| 5,956,485 | A | 9/1999 | Perlman |
| 6,048,271 | A | 4/2000 | Barcelou |
| 6,287,202 | B1 | 9/2001 | Pascal et al. |

OTHER PUBLICATIONS

Seninsky, Frank, “The National Amusement Network is on Track for Sucess,” Frank Talk, RePlay Magazine, Apr. 1995, p. 157–158.

“NANI in a Nutshell,” RePlay Magazine, Jan. 1995, p. 38.

“NANI: What’it All About?,” RePay Magazine, Jan. 1995, p. 39–56 (even pages only).

The National Amusement Network, “On–Line Transaction Processing Protocol Specification,” Revision 2.1, Feb. 1996.

The National Amusement Network, “Embedded Network Controller Specification for Game Manufacturers,” Revision 2.1, Feb. 1996.

Countrywide Competitors, “CWC Amusement Centres”.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 2 and 7 were previously cancelled.

Claims 1, 3–6 and 8–11 are cancelled.

* * * * *